United States Patent Office 3,385,354
Patented May 28, 1968

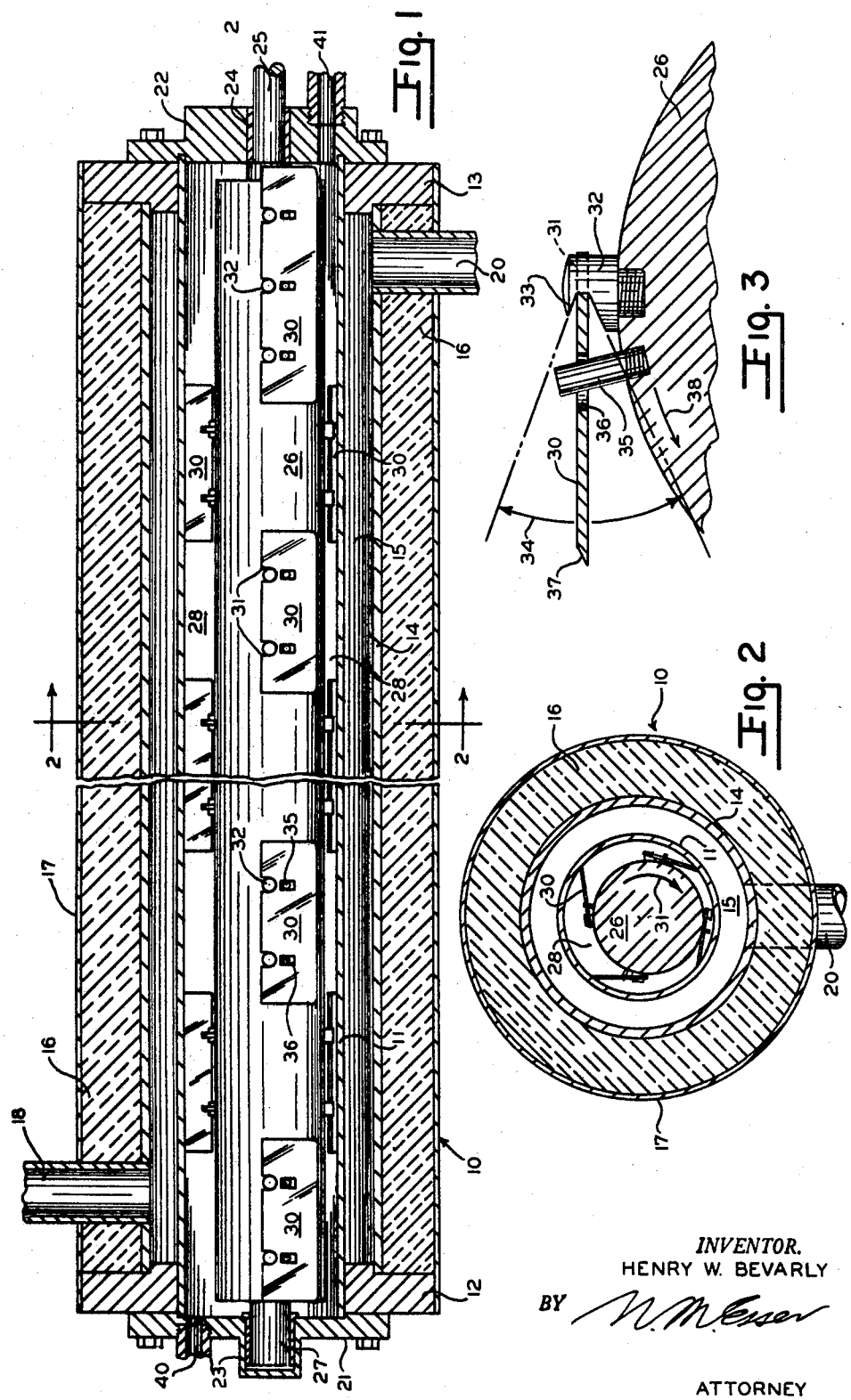
INVENTOR.
HENRY W. BEVARLY
BY
ATTORNEY

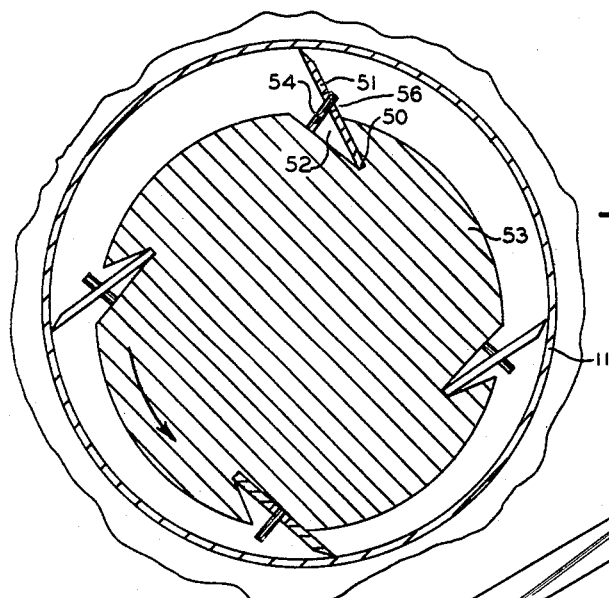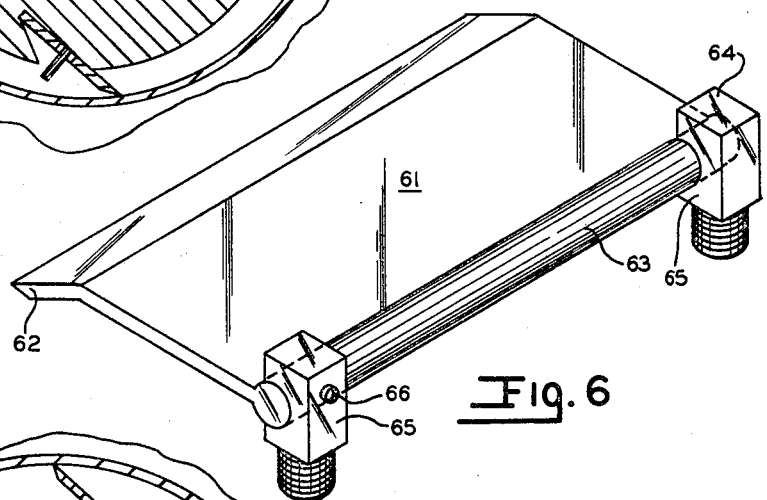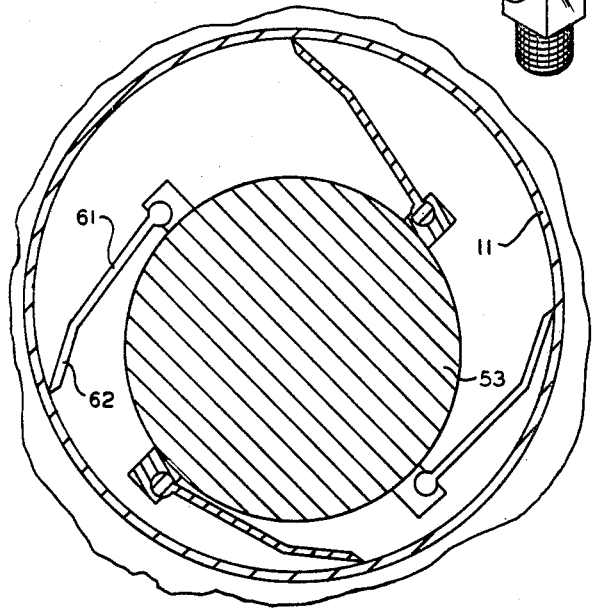

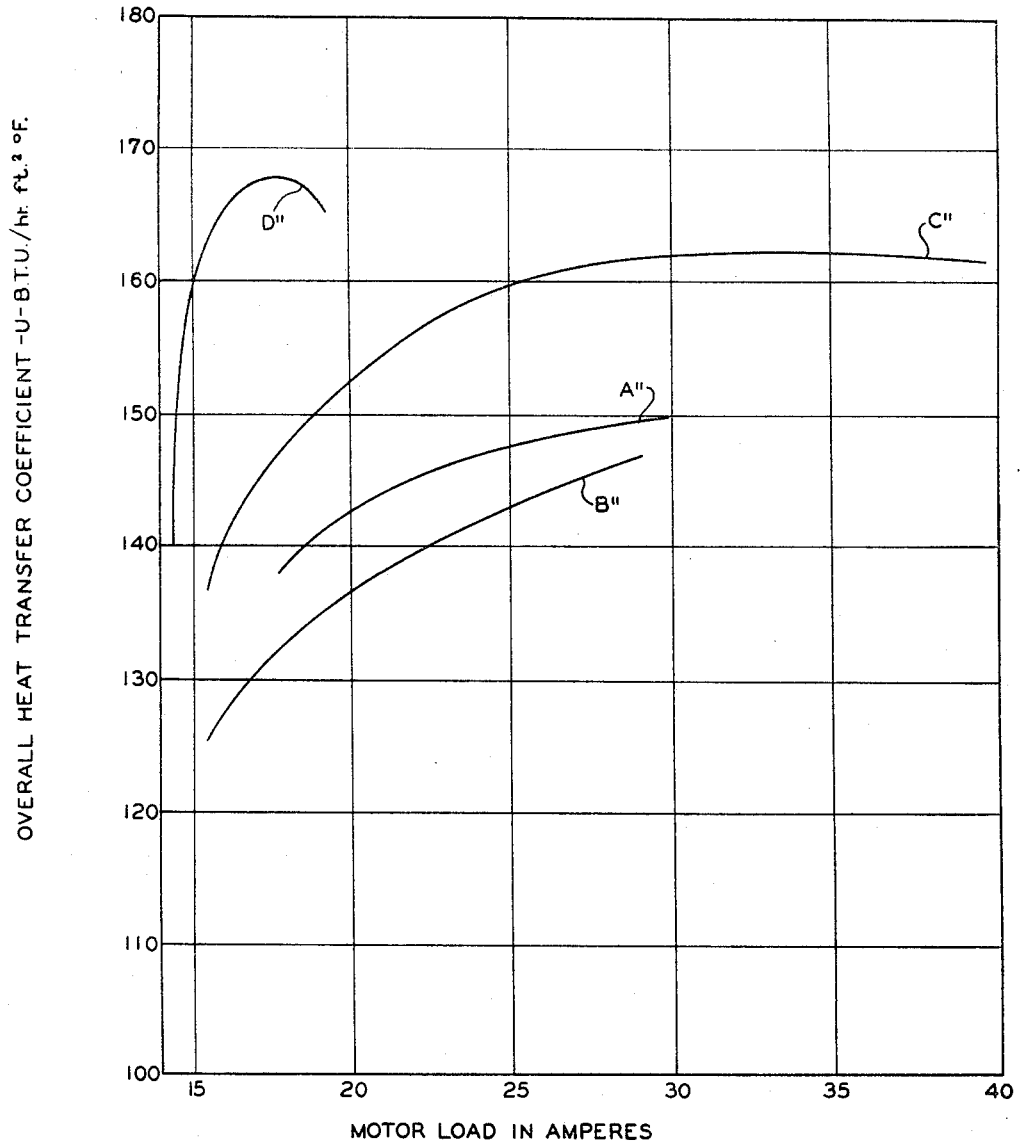
Fig. 9
INVENTOR.
HENRY W. BEVARLY
BY 
ATTORNEY

3,385,354
SCRAPED SURFACE HEAT EXCHANGE
APPARATUS
Henry W. Bevarly, Louisville, Ky., assignor to Chemetron
Corporation, Chicago, Ill., a corporation of Delaware
Continuation of application Ser. No. 154,690, Nov. 24,
1961, which is a continuation of application Ser. No.
828,414, July 20, 1959, which in turn is a continuation-
in-part of application Ser. No. 755,188, Aug. 15, 1958.
This application Feb. 4, 1965, Ser. No. 432,447
2 Claims. (Cl. 165—94)

ABSTRACT OF THE DISCLOSURE

Apparatus having a heat exchange tube and a revolving mutator shaft, eccentrically located with respect to the axis of the tube and carrying blades for continuously processing fluid material.

This application is a continuation of co-pending application Ser. No. 154,690, filed Nov. 24, 1961, now abandoned, which is a continuation of application Ser. No. 828,414, filed July 20, 1959, now abandoned. Application Ser. No. 828,414 was a continuation-in-part of application Ser. No. 755,188 filed Aug. 15, 1958, now abandoned.

This invention relates generally to scraped surface heat exchangers and more particularly to an improved apparatus for continuously processing liquid or semi-plastic materials such as margarine, ice cream, peanut butter, lubricating grease, confections, triglyceride oils, and detergents. Moreover, the apparatus of this invention may be utilized as a continuous reaction vessel for carrying out a wide variety of chemical reactions such as sulfonation and polymerization where it is desired to add or subtract heat from the substances during the reaction step.

Scraped surface continuous heat exchange apparatus of the kind where the material to be treated passes through an annular space defined by a jacketed cylinder and revolving mutator shaft, journalled for rotation about the axis of the cylinder and carrying blades for scraping the cylindrical heat exchange surface, have been in use for many years and have proved to be quite suitable for a wide variety of processing applications in which the heating or cooling of materials to be treated is desired. Such prior apparatus is illustrated and described in U.S. Patent 2,481,436 granted to Bruce D. Miller for Improvements in Processing Starch Pastes.

The prior apparatus has been found to have certain disadvantages which, prior to the present invention, have not been completely overcome. When very viscous or adhesive materials are processed in an annular type scraped surface heat exchanger, the amount of power required to rotate the mutator shaft is quite high, necessitating the use of large drive motors and associated power transmission equipment. Moreover, the work done in rotating the mutator shaft and blades is largely dissipated in the form of heat in the material being processed. In applications where the material is being cooled, this heat due to mechanical working must also be removed from the product, thereby imposing an additional cooling load upon the apparatus and effectively reducing its capacity.

Another difficulty is that with viscous or adhesive materials the over-all heat transfer efficiency of the apparatus tends to be lower due to the formation of static films on the heat transfer surface. Normally, the heat transfer efficiency can be increased by increasing the frequency of scraping the heat transfer surface, i.e., increasing the speed of rotation of the mutator shaft. This, of course, increases the power required to rotate the shaft. Another difficulty experienced with adhesive and viscous materials is that they tend to stick to the mutator shaft and rotate as a mass with the shaft, thereby reducing the heat transfer efficiency and the capacity of the apparatus. This phenomenon has been termed "mass rotation."

One object of this invention is to provide a scraped surface heat exchanger, suitable for either heating or cooling various materials, which requires less mechanical power input than conventional apparatus of this kind.

A second and related object is to provide an apparatus in which relatively lower mutator shaft speeds may be utilized.

Another object is to provide an apparatus capable of achieving higher over-all heat transfer efficiency than conventional apparatus and thereby of increased capacity and in which mass rotation does not occur.

Another important object is to provide an apparatus having an improved mixing function over conventional apparatus and which is thereby more effective in carrying out process steps in which intimate mixing of ingredients is desired.

Other objects and advantages of the apparatus of this invention will become apparent to those familiar with the art upon reading the following detailed description in conjunction with the appended claims and the drawings, in which:

FIG. 1 is a longitudinal section through a preferred embodiment of the heat exchanger of this invention;

FIG. 2 is a cross section taken on line 2—2 of FIG. 1;

FIG. 3 is an enlarged section showing the manner in which the scraper blades are mounted;

FIG. 4 is a cross section similar to FIG. 2 but showing a modified mutator shaft and blade arrangement;

FIG. 5 is a cross section similar to FIG. 2 but showing another form of blade and mounting arrangement;

FIG. 6 is a perspective view showing the mounting of a blade of FIG. 5;

FIG. 9 is a graph of a family of curves obtained by plotting over-all heat transfer efficiency vs. motor load.

Figure 7:
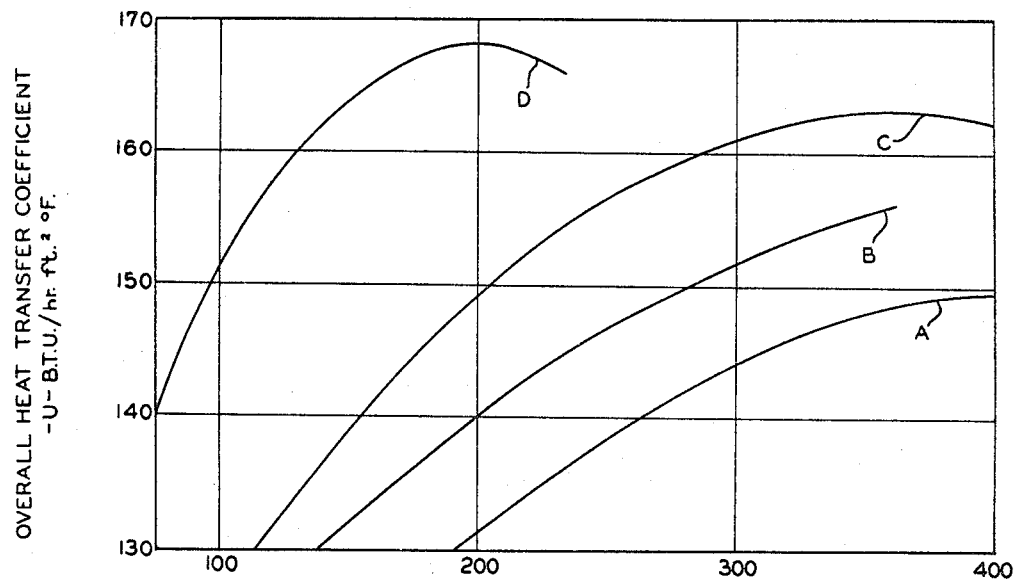
FIG. 7 is a graph of a family of curves obtained by plotting mutator shaft speed vs. over-all heat transfer efficiency as measured during comparative tests of apparatus of this invention and conventional apparatus.

It has been discovered, contrary to all reasonable expectations, that, if the mutator shaft is mounted not concentrically with respect to the cylindrical heat transfer wall in an annular type heat transfer device but eccentrically in such fashion that the scraper blades pivot inwardly and outwardly with each revolution of the shaft, not only is the heat transfer efficiency radically improved but also the amount of mechanical power required to rotate the shaft is reduced. This is very surprising, for it would be expected that considerable additional work would be required to reciprocate the blades inwardly and outwardly with each revolution. Moreover, it has been found that the additional mechanical working has a very beneficial effect in many operations such as the formation of emulsions, the mixing of two substances, aeration or other gasification operations, et cetera, with the result that superior products and products heretofore unobtainable may be produced.

Another advantage which accrues is that mass rotation of the material being processed with the mutator shaft is virtually eliminated by reason of the fact that the constricted area through which the mass must rotate in the region where the shaft is closest to the heat exchange tube wall greatly impedes rotation of the material being processed with the shaft.

A preferred embodiment of apparatus of this invention is illustrated in FIGS. 1–3 of the drawing. The heat exchange apparatus 10 comprises an elongated heat transfer tube 11 which is attached at its ends to a pair of ring-like members 12 and 13. These members also support a second tube 14 somewhat larger than tube 11 which is concentrically disposed with respect to tube 11 and together with this tube defines an annular jacket space 15 for heat exchange fluid such as water, brine, ammonia or steam. The tube 14 is surrounded by insulation 16 which is enclosed within a cylindrical outer shell 17. Conduit elements 18 and 20 provide a means for introduction and withdrawal of the heat exchange medium from the annular space 15.

End plates 21 and 22 are attached to the members 12 and 13 respectively and are so mounted as to be in sealed relation with the heat transfer tube 11. The end plate 21 is provided with a bearing 23 and the plate 22 is provided with another bearing indicated at 24 through which the drive end 25 of the mutator shaft 26 extends. A stub end 27 on the opposite end of the shaft is journalled in bearing 23.

Thus the shaft 26 is mounted for rotation within the heat transfer tube 11 and together with the tube defines a generally annular space 28. Upon examination of FIG. 2 it will be noted that this annular space does not have a uniform width and is only approximately one half as wide on the lower side of FIG. 2 as on the upper side of FIG. 2. This eccentricity in the annular space 28 is achieved by locating the bearings 23 and 24 in the end plates 21 and 22 eccentrically with respect to the tube 11. It will be noted that the enlarged central portion of the shaft 26 is concentric with the projecting portions 25 and 27 and that the eccentricity is accordingly achieved solely by the eccentric location of the bearings 23 and 24.

The enlarged central portion of the shaft 26 has supported thereon a plurality of pivotally mounted scraper blades 30. The arrangement for supporting these blades in this preferred embodiment is best shown in FIG. 3. The trailing edge of each blade 30 is provided with a plurality of notches 31 which receive pins 32 carried by the shaft 26. The pins 32 are also notched as indicated at 33 to prevent radial movement of the trailing edges of the blades 30. Thus the blades are freely pivotable through the arc indicated at 34 in FIG. 3. To retain the blades in position a plurality of pins 35 are provided which project through slots 36 located in the blades 30. These pins 35 as well as the pins 32 are preferably threadably mounted in the shaft 26 so that they may be removed should replacement of the blades or pins become necessary. The leading edges 37 of the blades 30 are bevelled as shown in FIG. 3 so as to provide a knife-like edge for scraping the surface of the tube 11 free of the material undergoing heat transfer. Incidentally, the direction of rotation of the shaft 26 is indicated by arrows 38 in FIGS. 2 and 3 and is such that the sharp edges of the blades are continuously moving in the direction of the arrows 38.

Centrifugal force and the resistance of the material being processed cause the sharpened ends 37 of the blades 30 to be continually in contact with the inside surface of the heat transfer tube 11, and because of the eccentric mounting of the shaft 26 with respect to the tube 11, the ends 37 of the blades 30 continually move in and out with respect to the surface of the shaft 26. Thus in FIG. 2 it will be seen that the lower-most blade is closely adjacent to the surface of the shaft 26 while the upper-most blade 30 diverges considerably from the surface of the shaft.

Openings 40 and 41 located in the end plates 21 and 22, respectively, provide means for the product to be treated to enter and leave the annular space 28 in a continuous manner. It is preferred that the opening 40 serve as the inlet and the opening 41 as the outlet so that the space may be readily drained, but this is not necessary. As it is usually desired to operate the apparatus under positive pressure, a suitable pump (not shown) is provided for continuously supplying the material to be treated to the inlet 40. Also as is the usual practice in apparatus of this kind, suitable means for driving the shaft end 25, such as a motor and a pulley arrangement or a gear reducer driven by an electric motor, are provided. For purposes of simplifying the drawings no sealing devices have been shown for the shaft end 25 and for the points between the tubes and the members 12 and 13. It is to be understood that any conventional sealing arrangements may be utilized for purposes of effecting suitable seals at these points.

It should be noted that the blades 30 are in a sequential arrangement around the circumference and along the length of the shaft to form a staggered pattern about the surface of the shaft 26. As is apparent in FIG. 2 the rows of blades are disposed 90 degrees apart, and as shown in FIG. 1 the rows are not continuous, but the individual blades are spaced apart slightly less than the length of a blade. Moreover, the blades located in rows 90 degrees from adjacent rows are so disposed as to overlap the blades of the adjacent rows. Stated another way, the blades 30 are arranged in groups or sets along the shaft 26, with each set having at least two blades and with adjacent sets of blades being staggered and overlapped and disposed at 90 degrees with respect to each other. Thus the blades 30 scrape the full inside surface of the tube 11 even though spaces are provided between adjacent blades in a single row. This is the preferred arrangement of blades about the surface of the shaft 26. This blade arrangement, namely, alternate staggered rows, has been found to produce a superior mixing action, for as the shaft 26 rotates, each blade 30 acts somewhat like a plow, forcing material ahead of it. The material in turn resists the action of the blade and tends to split, a portion of the material passing on either side of the individual blade to be subsequently caught ahead of the following blade where the action is repeated. This continual splitting of the mass, augmented by the oscillating action of the blades which produces a kneading effect, has been found to not only produce very intense mixing but also to improve the over-all heat transfer efficiency. Some of the material passes beneath the blades, especially when they are in the wider region of the annular space.

The full advantages of this invention are achieved by utilizing staggered rows of overlapping blades as indicated, but in some instances where extreme mixing is not necessary it may be desirable to utilize rows of blades extending the full length of the shaft 26 and without intervening spaces. The 90 degree spacing of the rows of blades is preferred in smaller sized units up to about 8 inches in heat transfer cylinder diameter, whereas for larger units it is preferred to use greater numbers of rows of blades spaced at smaller angles from each other, for example in an apparatus having a cylinder 24 inches in diameter, it is preferable to use 12 rows of blades spaced 30 degrees apart. One reason for this is that larger diameter units inherently have greater peripheral blade speeds when turning at the same r.p.m. as smaller size units, and by utilizing additional rows of blades and lower shaft speeds in the larger units the velocity of scraping the tube wall may be maintained close to that experienced in smaller units with lesser rows of blades and shafts turning at higher speeds.

If best results are to be achieved in the apparatus of this invention, it has been found that the blade length should be kept relatively short and preferably should not exceed the diameter of the cylinder. For example, in a heat exchange apparatus constructed in accordance with FIGS. 1, 2 and 3 and in which the tube 11 had a diameter of 6 inches and a length of 48 inches, it has been found that optimum results are achieved by utilizing blades 5½ inches in length. Shorter blades 2¾ inches in length produced almost as good results frm the standpoint of heat transfer, but longer blades 10½ inches in length proved to be decidedly inferior.

The degree of eccentricity of the annular space 28 as determined by the location of the bearings 23 and 24 has been found to be critical, and if the full advantages of the invention are to be realized, must be such that the distance from the mutator shaft surface to the inner wall of the tube 11 in the zone of greatest distance must be at least about one and one half times the same distance measured in the zone of minimum distance. Eccentricities less than this amount apparently do not have sufficient mass rotation inhibiting effect and do not cause sufficient oscillating of the blades with concomitant kneading effect. In most instances the maximum ratio of maximum shaft to wall distance to minimum shaft to wall distance will be less than five to one.

The operation of the heat exchange apparatus of this invention is probably apparent from the foregoing description, but a résumé thereof may be helpful in fully understanding the invention. The material to be processed is continuously pumped into the annular space 28 through the inlet connection 40 and emerges from the outlet connection 41. The pressure drop through the apparatus is usually quite small due to the intense mechanical mixing action, but it is preferred to utilize relatively high inlet pressures in the range of 20 to 400 pounds per square inch preventing cavitation and insuring a steady flow through the apparatus. The heat exchange fluid which may be cool brine or any other conventional hot or cold fluid such as ammonia or Freon enters the apparatus through connection 18 and flows through the jacket space 15, leaving through connection 20. Suitable baffle means or other means for controlling the flow of the heat exchange fluid may be provided in the jacket space 15 if desired. In order to simplify the drawings such means have not been shown. Thus the heat exchange tube 11 is maintained at a temperature different from the temperature of the material to be treated which passes through the generally annular space 28 and the transfer of heat through the tube wall 11 occurs. The shaft 26 in smaller size units (up to 10 inches in diameter) is caused to rotate at a speed of between about 50 and about 200 r.p.m. in the direction shown by the arrow 38 in FIG. 2 by the drive motor (not shown), acting through the shaft extension 25. Large units provided with many rows of blades may employ even lower shaft speeds.

Centrifugal force and the resistance of the material undergoing processing cause the leading edges 37 of the blades 30 to be forced outwardly into continuous contact with the tube wall 11, and the sharpened edges of these blades continuously scrape the material being processed off of the tube wall. Thus with the passage of each blade the heat exchange surface is swept clean of the static film and replaced by additional material undergoing processing for highly efficient heat transfer, the rate of which is largely dependent upon the nature and thickness of the static film.

In addition to the scraping action, however, the blades exert both a kneading action with each oscillation inwardly and outwardly as the shaft passes through a single revolution and the plowing action described above. The combination of these actions causes not only high turbulence within the generally annular space 28 but also a very thorough mixing action which has been found to be highly conducive to operations such as the formation of emulsions and the incorporation of gases in fluid or semi-fluid materials. Thus the material entering through the inlet 40 is not only altered in temperature during passage through the apparatus to assume a temperature close to that of the heat exchange fluid but is also plowed and kneaded and thoroughly mixed during passage through the apparatus from which it emerges at outlet connection 41.

A modified arrangement for supporting the scraper blades is shown in FIG. 4. In this embodiment, instead of being supported upon pins extending from the surface of the mutator shaft, the trailing edges 50 of the blades 51 are received in V-shaped slots 52 provided in the surface of the mutator shaft 53. Thus the blades 51 are pivotally carried by the shaft 53 and behave in much the same manner as the blades 50 in the embodiment shown in FIGS. 1–3. In order to retain the blades 51 in the slots 52, removable pins 54 are provided which project through slots 56 and operate in the same manner as the pins 35 and slots 36 in the preferred embodiment. As in the preferred embodiment the blades are preferably staggered. The arrangement of FIG. 4 is particularly useful where relatively high eccentricity is desired, and by housing the major portion of the blades within the periphery of the mutator shaft 53 it is possible, if desired, to locate the shaft so that at the closest point its outer surface is very close to the inner wall of the heat transfer tube 11. As explained previously the constricting effect of this narrow zone prevents mass rotation of the material being processed.

In FIGS. 6 and 7 another form of blade arrangement is illustrated. In this case the blades 61 are not flat but are bent at a slight angle near their leading edges in order to reduce the angle of attack of the leading edges 62 with respect to the tube wall 11. This arrangement is useful in certain instances where the angle of attack would otherwise be so large as to be likely to result in galling of the tube. It will also be noted that a somewhat different arrangement of blade pivoting has been utilized. The trailing edges of the blades are provided with beads 63 which are received in rounded slots 64 provided in pins 65. The set screw 66 is received in a shallow groove (not shown) provided in the bead 63 and prevents longitudinal movement of the blade 61. Needless to say, the bent blade arrangement of this embodiment may be used with either of the above-described blade supporting arrangements (FIG. 3 and FIG. 4) if small blade attack angles are desired.

Figure 8:
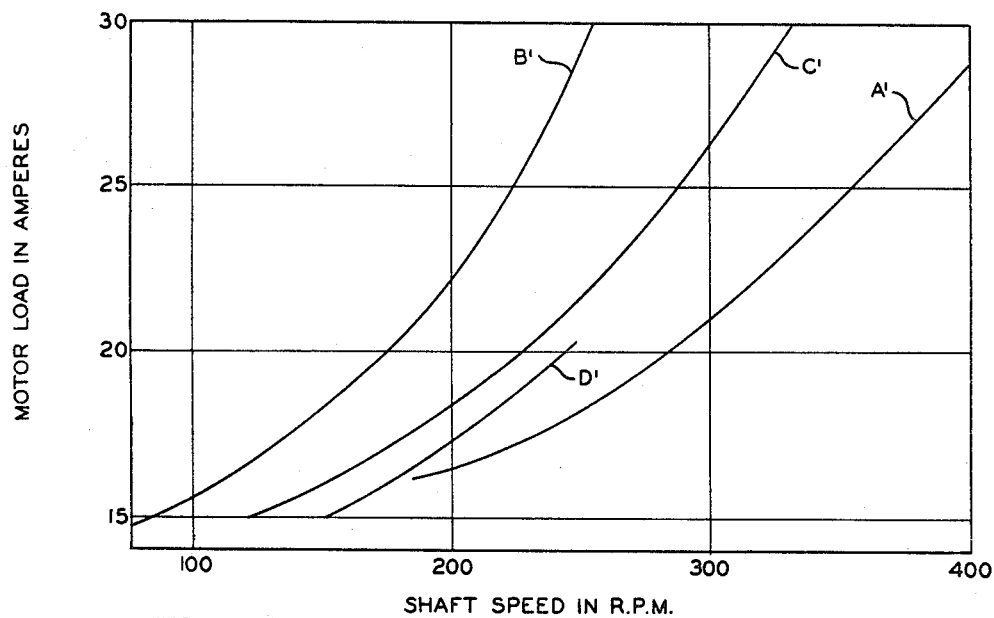
FIG. 8 is a graph of another family of curves obtained by plotting motor load vs. mutator shaft speed as measured during the comparative tests.

The remarkable superiority of the novel apparatus and process of this invention is graphically illustrated by the families of curves of FIGS. 7, 8 and 9 which were plotted from actual test data obtained during a series of tests made cooling peanut butter from a temperature of 165° F. to various temperatures in the range of 85° to 100° F. Peanut butter was selected for these test runs as it is known to be a very difficult product to cool rapidly because of its high viscosity particularly at lower temperatures.

The scraped surface heat exchanger used in the tests had a six inch internal diameter heat transfer cylinder forty eight inches in length provided with an external jacket space through which cold brine was pumped. Interchangeable heads and shafts were employed so that the unit could be quickly changed from a conventional concentrically mounted shaft unit to an eccentrically mounted shaft unit. Moreover, the shafts were so constructed that scraper blades of different lengths and types and in different arrangements could be tested with each shaft. The diameter of the eccentric shaft was 4⅞₁₆ inches and it was mounted for rotation about an axis disposed ⅜ inches from the axis of the cylinder. The diameter of the concentrically mounted shaft was 4¹⁵⁄₁₆ inches. The unit was provided with a drive motor and variable speed reducer so that the shafts could be rotated at selected speeds.

Brine at temperatures ranging from 24 degrees to 48 degrees F. was pumped through the jacket at a rate of 36 gallons per minute and at this rate the temperature rise on the jacket side was maintained in the 3 to 4 degree range. Peanut butter was pumped through the cylinder at an inlet temperature of 165 degrees F. and at a rate of 2,200 pounds per hour. The outlet temperature of the peanut butter was found to vary according to the efficiency of heat transfer obtained and the inlet brine temperature utilized.

Blades of different lengths ranging from 2¾ inches to 7¹³⁄₁₆ inches were employed, and for different test runs they were arranged on the two shafts in different manners ranging from two rows of blades located 180 degrees apart with each row extending the full length of the shaft to four rows of very short 2¾ inch blades arranged with a space of approximately the same distance between adjacent blades in the same rows and with the blades of adjacent rows arranged in a staggered or overlapping pattern. Four rows of continuous blades spaced 90 degrees apart were also employed.

During these test runs data were collected as to product and brine flow rates, inlet and outlet temperatures, mutator shaft speeds and pressure drops. From these data over-all heat transfer efficiencies for the various shaft and blade assemblies and at selected shaft speeds were calculated, and the family of curves of FIG. 7 were obtained by plotting the net U or over-all heat transfer coefficient expressed in B.t.u./hr. ft.$^2$° F. vs. shaft speed.

Curve A of FIG. 7 which exhibits the lowest U values was obtained by plotting the results of runs utilizing a concentrically mounted shaft with two full rows of blades spaced 180 degrees apart. Curve B which exhibits somewhat higher U values was obtained from runs with the same shaft equipped with four full rows of blades spaced 90 degrees apart. Curve C was obtained by plotting data obtained from runs utilizing a staggered blade arrangement like that shown in FIGS. 1 and 2 with 5½ inch blades but with the shaft and heat transfer tube arranged concentrically. The values of U are somewhat higher for all shaft speeds than in the runs illustrated by curves A and B but are generally of the same magnitude. It is interesting to note that in the runs represented by curve C only half as many blades were used as in the runs represented by curve B.

Curve D was obtained by plotting the results of a series of runs made with the eccentrically mounted shaft type apparatus of this invention. The blade arrangement was the same as in the curve C runs, but in the D runs the shaft axis was displaced ⅜ inches from the center line of the heat transfer tube. It will be noted that much higher values of U were obtained and that these high values were experienced at very low shaft speeds with maximum heat transfer efficiency occurring at about 200 r.p.m.

In FIG. 8 there are plotted four curves labelled A', B', C', and D' corresponding to the curves of FIG. 7 but obtained by plotting the motor load in amperes vs. mutator shaft speed. It will be noted that the eccentric shaft runs (curve D') required less electrical power at all shaft speeds than did the concentric shaft runs with the same blade arrangement (curve C') or with four full rows of blades (curve B'). The concentric shaft runs with 2 full rows of blades (curve A') required less power at all speeds than the eccentric shaft, but it is improper to draw a comparison for this two-blade row concentric shaft exhibited the lowest heat transfer efficiency (see FIG. 7) and even when operated at very high shaft speeds did not approach the efficiency of the eccentric shaft.

Truly comparative data as to the relative efficiencies of the various blade and shaft arrangements are shown in FIG. 9. The curves of FIG. 9 were prepared from the curves of FIGS. 7 and 8 using selected shaft speeds as parameters and plotting the corresponding values of U and power load to obtain the curves A", B", C" and D", which correspond to the other curves bearing the same letters. Thus FIG. 9 gives a direct comparison between the over-all heat transfer achievable with each different shaft and blade arrangement and the amount of electrical power required to achieve this efficiency. The position of eccentric shaft curve well above and to the left of the family of curves resulting from the concentric shaft runs is striking proof of the unexpected superiority of the apparatus of this invention. It should be noted that the relative positioning of the vertical axis of the graph at a value of 14 amperes is realistic, as no-load tests with the apparatus empty indicated that the no-load current was 14 amperes. Thus this axis effectively represents no-load conditions and it is apparent that the operation of the apparatus with the eccentric shaft requires very little current over no-load conditions even at maximum heat transfer efficiency. This is particularly significant in cooling operations where the power consumed within the unit results in heating of the product, which additional heat must also be removed.

From the foregoing it will be readily apparent to those familiar with the art that a manifestly superior heat exchange apparatus has been provided. Certain modifications have been described but other changes and modifications such as will present themselves to those familiar with the art may be made without departing from the spirit of this invention.

What is claimed is:

1. In combination, an elongated heat transfer tube having a generally cylindrical, horizontally disposed interior wall for processing viscous fluid materials; a pair of end plates attached at opposite ends of and in sealed relation with the tube; means surrounding said tube for receiving a heat exchange medium; a shaft journalled in the end plates for rotation within the tube, the rotational axis of the shaft being eccentrically disposed with respect to the tube axis, the interior wall of the tube and the exterior surface of the shaft defining a generally annular space extending substantially the full length of the tube between the end plates, said annular space varying in radial dimension and having a constricted annular space where the shaft is closest to the interior wall and a region of greater annular space where the shaft is farthest from the interior wall, the constricted space being generally located on the lower side of the tube, the region of greater space being at least one and a half times that of the constricted annular space, means for rotating the shaft; a pump for continuously supplying the fluid materials under positive pressure; inlet and outlet means at opposite ends of said tube for introducing and withdrawing the material being processed in the tube, the inlet means communicating with the pump and with the region of greater annular space, the outlet means communicating with the constricted annular space; a plurality of sets of pivotally mounted scraper blades carried by said shaft in a sequential arrangement around the circumference and along the length of the shaft to effect scraping of substantially the entire interior wall of the tube between the end plates; said blades being spaced from the shaft to effect passage of a portion of the material beneath the blades in varying degrees depending on the position of the blades with respect to the annular space of varying dimension, whereby intimate mixing of said viscous fluid material is accomplished.

2. The apparatus of claim 1 wherein, each set of blades includes at least two blades, adjacent sets of blades being staggered and overlapped and disposed at 90 degrees with respect to each other and the individual blades are shorter in length, measured in the direction of the shaft axis than the diameter of the cylindrical chamber.

References Cited
UNITED STATES PATENTS

| | | | |
|---|---|---|---|
| 1,448,608 | 3/1923 | Tybout | 259—9 X |
| 2,211,387 | 8/1940 | Routh | 259—9 X |
| 2,470,691 | 5/1949 | Frickson et al. | |
| 2,526,367 | 10/1950 | Kaltenbach et al. | |
| 2,589,350 | 3/1952 | Edmunds | 165—94 |
| 2,955,026 | 10/1960 | Hollings et al. | 23—285 |
| 3,235,002 | 2/1966 | Beverly et al. | 165—94 |

ROBERT A. O'LEARY, *Primary Examiner.*

T. W. STREULE, *Assistant Examiner.*